United States Patent
Mendelsohn

(10) Patent No.: US 8,560,420 B2
(45) Date of Patent: Oct. 15, 2013

(54) CALCULATING PREDICTIVE TECHNICAL INDICATORS

(75) Inventor: Louis B. Mendelsohn, Wesley Chapel, FL (US)

(73) Assignee: Predictive Technologies Group, LLC, Wesley Chapel, FL (US)

( * ) Notice: Subject to any disclaimer, the term of this patent is extended or adjusted under 35 U.S.C. 154(b) by 401 days.

(21) Appl. No.: 12/632,291

(22) Filed: Dec. 7, 2009

(65) Prior Publication Data

US 2011/0137821 A1 Jun. 9, 2011

(51) Int. Cl.
*G06Q 40/00* (2012.01)

(52) U.S. Cl.
USPC ................. 705/36 R; 705/35; 705/37

(58) Field of Classification Search
USPC ............................ 705/35, 36 R, 37
See application file for complete search history.

(56) References Cited

U.S. PATENT DOCUMENTS

| | | | |
|---|---|---|---|
| 5,444,819 A | 8/1995 | Negishi | |
| 5,761,442 A | 6/1998 | Barr et al. | |
| 6,236,977 B1 | 5/2001 | Verba et al. | |
| 6,453,303 B1 | 9/2002 | Li | |
| 6,735,580 B1 | 5/2004 | Li et al. | |
| 6,907,403 B1 | 6/2005 | Klein et al. | |
| 7,076,461 B2 | 7/2006 | Balabon | |
| 7,328,182 B1 | 2/2008 | Yahil et al. | |
| 7,356,504 B2 | 4/2008 | Mueller | |
| 7,467,108 B2 | 12/2008 | Papka | |
| 7,529,703 B2 | 5/2009 | Benzschawel | |
| 2002/0007331 A1 | 1/2002 | Lo et al. | |
| 2002/0099636 A1 | 7/2002 | Narumo | |
| 2002/0123951 A1* | 9/2002 | Olsen et al. | ..................... 705/36 |
| 2003/0135445 A1 | 7/2003 | Herz et al. | |
| 2003/0149648 A1 | 8/2003 | Olsen et al. | |
| 2003/0182250 A1 | 9/2003 | Shihidehpour et al. | |
| 2004/0236667 A1 | 11/2004 | Cotton | |
| 2005/0021436 A1 | 1/2005 | Dowling | |
| 2005/0038729 A1 | 2/2005 | Hsu | |
| 2005/0090911 A1 | 4/2005 | Ingargiola et al. | |
| 2005/0091146 A1 | 4/2005 | Levinson | |
| 2005/0091147 A1 | 4/2005 | Ingargiola et al. | |
| 2005/0131790 A1* | 6/2005 | Benzschawel et al. | ......... 705/35 |
| 2005/0197889 A1 | 9/2005 | Prigogin et al. | |
| 2006/0004653 A1 | 1/2006 | Strongin, II | |
| 2006/0059065 A1 | 3/2006 | Glinberg et al. | |
| 2007/0100722 A1 | 5/2007 | Ferguson | |
| 2007/0143200 A1 | 6/2007 | Muller | |
| 2007/0156479 A1 | 7/2007 | Long | |
| 2008/0109379 A1 | 5/2008 | Cofnas et al. | |
| 2008/0177670 A1 | 7/2008 | Reid | |

(Continued)

OTHER PUBLICATIONS

VantagePoint Intermarket Analysis Software, www.tradersworld.com.*

(Continued)

*Primary Examiner* — Jason M Borlinghaus
*Assistant Examiner* — Hao Fu
(74) *Attorney, Agent, or Firm* — Cuenot, Forsythe & Kim, LLC

(57) ABSTRACT

A suite of predictions is defined to model the financial data commonly used to calculate technical indicators one or more periods in the future. Neural networks are trained to make these predictions. The predictions are then integrated with the standard technical indicator calculations to produce predictive technical indicators which are superior because they lead more and lag less.

15 Claims, 5 Drawing Sheets

Information Processing System 10

(56) References Cited

U.S. PATENT DOCUMENTS

| | | | |
|---|---|---|---|
| 2008/0208777 | A1 | 8/2008 | Stephens |
| 2008/0313065 | A1 | 12/2008 | Eder |
| 2009/0018891 | A1 | 1/2009 | Eder |
| 2009/0024504 | A1 | 1/2009 | Lerman et al. |
| 2009/0063359 | A1 | 3/2009 | Connors |
| 2009/0083195 | A1 | 3/2009 | Aymeloglu et al. |
| 2009/0192949 | A1 | 7/2009 | Ferguson |
| 2009/0198634 | A1 | 8/2009 | Ferguson |
| 2009/0313041 | A1* | 12/2009 | Eder ................................ 705/2 |
| 2010/0191634 | A1 | 7/2010 | Macy |
| 2010/0217651 | A1 | 8/2010 | Crabtree |
| 2011/0035331 | A1* | 2/2011 | Engel et al. ................. 705/36 R |
| 2011/0040666 | A1 | 2/2011 | Crabtree |
| 2011/0071882 | A1 | 3/2011 | Jakagnanam |
| 2011/0137781 | A1 | 6/2011 | Mendelsohn |

OTHER PUBLICATIONS

TME, VantagePoint prediction software for sale, T2W forum, Feb. 12, 2009.*

Ruggiero, M. A., Jr.: "The truth about intermarket analysis," 2005, <<http://search.proquest.com/docview/235266080?accountid=14753>>.

Ruggiero, M.A., Jr.: "Using neural nets the right way," 2006, <<http://search.proquest.com/docview/235271272?accountid=14753>>.

Mendelson: "Trend Forecasting with Intermarketing Analysis: Predicting Global Markets with Technical Analysis," May 31, 2008.

Mendelson: "Trend Forecasting with Technical Analysis: Unleashing the Hidden Power of Intermarket Analysis to Beat the Market," Dec. 11, 2000.

Lawrence: Using Neural Networks to Forecast Stock Market Prices,: Dept. of Computer Science, University of Manitoba, Dec. 12, 1997.

Mendelsohn, Louis B., "Forex Trading Using Intermarket Analysis", Mar. 8, 2006, Marketplace Books, ISBN-10: 1592802958, ISBN-13: 978-1592802951.

Ho, Trang, "Exchange Traded Funds—Using ETFs to see Market's Warning Signs," Jun. 16, 2009, Investor's Business Daily.

Brabazon, Tony, "A Connectivist Approach to Index Modelling in Financial Markets," Aug.-Sep. 2000, Coil Summer School, University of Limerick.

Murhpy, John L., "Intermarket analysis: Profiting from Global Market Relationships," 2004, Wiley, 1st Edition, ISBN-10: 0471023299, ISBN-13:978-0471023296.

Ruggiero, M. A., Jr., "Using Neural Nets the Right Way," Aug. 2006, Futures, Chicaco, n10; p. 40.

Thawornwong, S. et al., "Neural Networks as a Decision Maker for Stock Trading: A Technical Analysis Approach," 2003, International Journal of Smart Engineering System Design, vol. 5, Issue 4:313-325.

Chung, K.K.: "Financial Forecasting Using Neural Network or Machine Learning Techniques," Oct. 2001, Electrical Engineering Thesis Project.

Krutsinger, J.: "New Twist on an Old Indicator," 2005, Futures Magazine, <<http://vp.trdertech.com/news/2005/jpekrut_article1.asp>> (last visited Jul. 7, 2011).

Yao, J.T. et al.: "A Case Study on Using Neural Networks to Perform Technical Forecasting of Forex," 2000, Department of Information Systems, Massey University, Palmerston North, New Zealand; School of Computing, National University of Singapore, Singapore 119260.

Zhang, Y.Q. et al.: "Granular Neural Web Agents for Stock Prediction," 2002, Department of Computer Science, Georgia Stat University, Atlanta, GA; The School of Electrical and Computer Engineering, Georgia Institute of Technology, Atlanta, GA; Department of Mathematics and Computer Science, San Jose State University, San Jose, CA ; Soft Computing, Springer Verlag.

Stevens, L. "Essential Technical Analysis: Tools and Techniques to Spot Market Trends," Mar. 22, 2002, Wiley, 1st edition, ISBN-10: 047115279X, ISBN-13: 9780471152798.

Tilakaratne, C.D. et al.: Effectiveness of Using Quantified Intermarket Influence for Predicting Trading Signals of Stock Markets, Center for Informatics and Applied Optimization, School of Information Technology and Mathematical Sciences, University of Ballarat, Australia; Department of Statistics, University of Colombo, Colombo, Sri Lanka.

Mendelsohn, Louis B., "Trend Forecasting with Intermarket Analysis: Predicting Global Markets with Technical Analysis," May 31, 2008.

Mendelsohn, Louis B., "Trend Forecasting with Technical Analysis: Unleashing the Hidden Power of Intermarket Analysis to Beat the Market," Dec. 11, 2000, Marketplace Books, ISBN-10: 1883272912, ISBN-13: 978-1883272913.

Lawrence, Ramon: "Using Neural Networks to Forecast Stock Market Prices," Dept. of Computer Science, University of Manitoba, Dec. 12, 1997.

Mendelsohn, Louis B., "Forex Trading Using Intermarket Analysis," Mar. 8, 2006, Marketplace Books, ISBN-10: 1592802958, ISBN-13: 978-1592802951.

Ho, Trang, "Exchange Traded Funds—Using ETFs to See Market's Warning Signs," Jun. 16, 2009, Investor's Business Daily (Abstract Only).

Brabazon, Tony, "A Connectivist Approach to Index Modelling in Financial Markets," Aug. 28-Sep. 3, 2000, CoIL Summer School, University of Limerick.

Bodis, Lorant, "Financial Time Series Forecasting Using Artificial Neural Networks," 2004, Master Thesis, Babes-Bolyai University, Faculty of Mathematics and Computer Science, Department of Computer Science.

Murhpy, John, "Intermarket Analysis: Profiting from Global Market Relationships," 2004, Wiley, ISBN-10: 0471023299, ISBN-13: 978-0471023296.

Ruggiero Jr., Murray A., "Using Neural Nets the Right Way," Aug. 2006, Futures Magazine, vol. XXXV, No. 10; pp. 40-43.

Thawornwong, Suraphan et al., "Neural Networks as a Decision Maker for Stock Trading: A Technical Analysis Approach," 2003, International Journal of Smart Engineering System Design, vol. 5, Issue 4, pp. 313-325 (Abstract Only).

Chung, Kim K.: "Financial Forecasting Using Neural Network or Machine Learning Techniques," Oct. 2001, Electrical Engineering Thesis Project, The University of Queensland, The School of Information Technology and Electrical Engineering.

Krutsinger, Joe, "New Twist on an Old Indicator," Sep. 2005, Futures Magazine, pp. 48-50.

Yao, Jingtao et al., "A Case Study on Using Neural Networks to Perform Technical Forecasting of Forex," Neurocomputing 34 (2000), pp. 79-98, received: Nov. 15, 1997; accepted: Apr. 12, 2000.

Zhang, Y.Q. et al., "Granular Neural Web Agents for Stock Prediction," Soft Computing 6 (2002), pp. 406-413, Springer-Verlag.

Stevens, Leigh, "Essential Technical Analysis: Tools and Techniques to Spot Market Trends," 2002, Wiley, ISBN-10: 047115279X, ISBN-13: 9780471152798.

Zontos, Sotiris et al., "Technical Analysis and Mutual Funds. Testing Trading Rules," 1999, Technical University of Crete, Greece.

Tilakaratne, Chandima D. et al., "Effectiveness of Using Quantified Intermarket Influence for Predicting Trading Signals of Stock Markets," 2007, Center for Informatics and Applied Optimization, School of Information Technology and Mathematical Sciences, University of Ballarat, Australia; Department of Statistics, University of Colombo, Colombo, Sri Lanka.

* cited by examiner

Predictive Server 12

Trading Application 14

Method of Generating A Predictive Technical Indicator

Price of Gold

CALCULATING PREDICTIVE TECHNICAL INDICATORS

FIELD OF THE INVENTION

The invention relates generally to technical analysis of financial markets. More particularly, the invention relates to methods and systems for calculating predictive technical indicators.

BACKGROUND

Historically, the methods that have been used by traders to analyze the financial markets in an effort to identify and forecast the direction of price trends have been divided into two distinct approaches: fundamental analysis and technical analysis. Fundamental analysis focuses on underlying macro- and/or micro-economic factors such as Gross National Product, central bank policies, rates of inflation, unemployment rates, market share, earnings, profitability and supply/demand. The premise behind technical analysis is that all the factors that affect a specific market at any given point in time are already built into that market's price, even if these factors are based on fundamentals or mass-psychology. Technically oriented traders concentrate on using various technical studies, indicators, and market-forecasting theories to analyze market behavior.

Traders are people who buy and sell financial instruments that are publicly traded on exchanges. Trading software applications subscribe to data from the exchanges and present it to traders, usually in the form of charts and watch lists. Traders and trading applications have come up with a variety of calculations that can be performed on electronic exchange data. Some of the more common technical indicators include trend indicators, momentum indicators, and volatility indicators. Many technical indicators, such as moving averages, attempt to filter out short-term variation in price so the underlying trend can be observed. A side effect of averaging past prices is that the indicator tends to lag behind the market. This causes the trader to respond late to market changes, resulting in lost profit opportunity and risk of increased losses.

SUMMARY

This invention relates to the development of methods, systems, and devices for developing technical indicators based on the combination of both historical and predicted data for a market. Historical data for a market can be obtained from available sources such as an exchange where the market trades. Predicted data can be obtained using a predictive server that uses intermarket analysis data to train neural networks to predict financial time series data. The invention can include software running on a back-end server (a predictive server) and a trading application (e.g., an application that runs on a trader's PC), which operate within an information processing system that includes market exchanges and financial data providers.

In one aspect of the invention, historical time series data can be obtained and analyzed, predicted future times series data can be obtained using intermarket analysis performed using neural networks, conventional technical indicator information can be obtained, and an algorithm can be used to integrate the predicted data with the conventional technical indicator information to arrive at a predicted technical indicator. The use of both historical data and predicted data results in a technical indicator that can lead more (lag less) than the conventional technical indicator on which it is based.

Intermarket analysis searches for relationships between markets that can be used to obtain useful information about what the prices of the markets will do. An intermarket whose price activity leads that of a market of interest is especially useful for financial forecasting. In the invention, intermarkets can be selected on a market-by-market basis prior to the training of the neural networks. The selected intermarkets can then be used during the training process to provide additional inputs to the neural networks, which improve the accuracy of the predictions. The intermarkets can be screened or selected on the basis of correlation analysis. The correlation can be a statistical calculation that measures the degree and type of relationship between two series of numbers, e.g., a positive correlation indicates the two series move together, a negative correlation indicates they move inversely, and zero correlation indicates the two series vary independently of each other.

Accordingly, the invention features a computer-implemented method of calculating a technical indicator of a market. The method includes the steps of: (a) obtaining historical data relating to the market from a server that includes a database of historical time series data for the market; (b) obtaining predicted future data relating to the market, e.g., using a predictive server that uses intermarket analysis data to train a neural network to predict financial time series data for the market, or other suitable methods such as trend-line analysis, fundamental analysis, and other market-forecasting theories; (c) using both the historical data and the predicted future data to calculate the predictive technical indicator; and (d) outputting the calculated predictive technical indicator. The information processing system can be divided into a predictive server and a predictive trading application. The predictive server can include a market manager component, an historical data manager, a neural network trainer, a trading application builder, an intermarket analysis component, a technical analysis component, a predictive technical analysis component, and a predictive server database. The calculated predictive technical indicator can be communicated to a trading application via a communications network. The trading application can include a watch lists component, a charts component, a grids component, a reports component, an intermarket analysis component, a technical analysis component, a predictive technical analysis component, and a predicative trader database.

In another aspect, the invention features a system for calculating a predictive technical indicator of a market. The system can include: (a) a first server that includes a database of historical time series data for the market; (b) a second server that uses intermarket analysis data to train a neural network to generate predicted financial time series data for the market or other suitable forecasting methods; and (c) a computer in communication with the first and second servers, the computer including computer-usable program code that uses both historical time series data for the market and the predicted financial time series data for the market to calculate the predictive technical indicator. The second server can include a market manager component, an historical data manager, a neural network trainer, a trading application builder, an intermarket analysis component, a technical analysis component, a predictive technical analysis component, and a predictive server database. The system can further include a trading application, and the calculated predictive technical indicator can be communicated to the trading application via a communications network. Alternatively, the system can further include a trading application on a trader's personal computer which calculates the predictive technical indicator using data communicated to it from a geographically remote (e.g., more than 1 km away) server. In the system, the trading application can include a watch lists component, a charts component, a grids component, a reports component, an intermarket analysis component, a technical analysis component, a predictive technical analysis component, and a predicative trader database.

Also within the invention is a computer program product that can include a computer-usable medium including computer-usable program code that, when executed by a computer, calculates a technical indicator for a market. The computer-usable medium can include: computer-usable program code that uses both historical time series data for the market and predicted financial time series data for the market obtained using a neural network that can be trained using intermarket analysis data to calculate the predictive technical indicator.

Unless otherwise defined, all technical terms used herein have the same meaning as commonly understood by one of ordinary skill in the art to which this invention belongs. Although methods and devices similar or equivalent to those described herein can be used in the practice or testing of the present invention, suitable methods and devices are described below. All publications, patent applications, patents and other references mentioned herein are incorporated by reference in their entirety. In the case of conflict, the present specification, including definitions will control.

DETAILED DESCRIPTION

Figure 1:
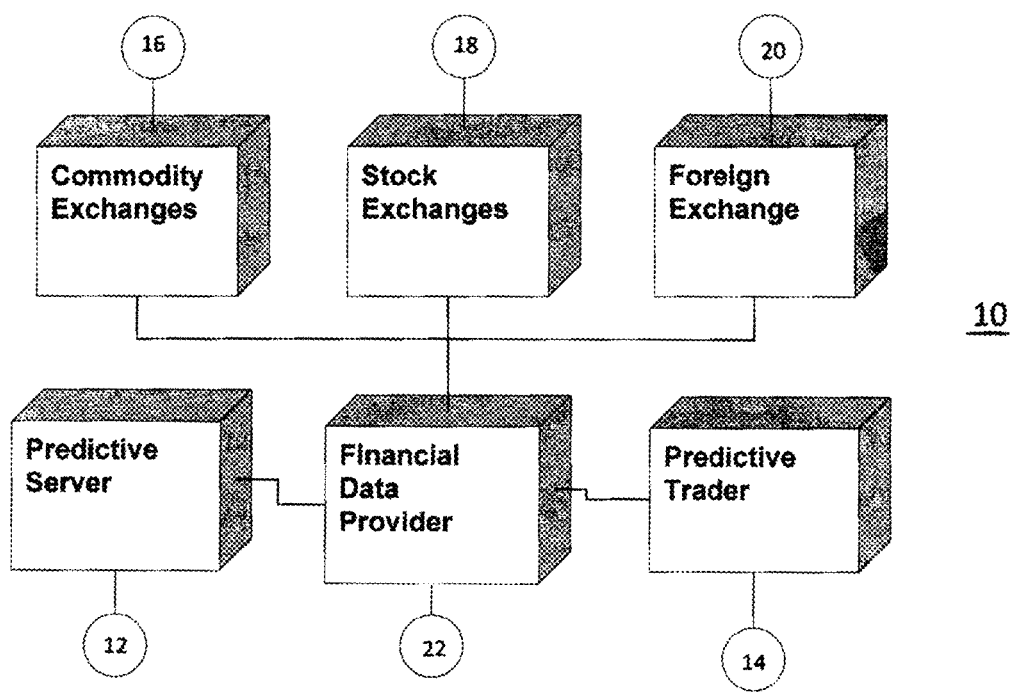
FIG. 1 is block diagram illustrating an information processing system of the invention.

This invention provides methods, systems, and devices for developing predictive technical indicators based on the combination of both historical and predicted data for a market, and can include software running on a back-end server (the predictive server) and a trading application (e.g., an application that runs on a trader's PC), which operate within an information processing system that includes market exchanges financial data. In a preferred embodiment, the methods, systems, and devices are used in conjunction with the methods and systems described in U.S. patent application Ser. No. 12/632,186 entitled "Intermarket Analysis" filed on Dec. 7, 2009 by inventor Louis B. Mendelsohn. The below described preferred embodiments illustrate adaptation of these methods, systems, and devices. Nonetheless, from the description of these embodiments, other aspects of the invention can be made and/or practiced based on the description provided below.

Various aspects of the invention may be embodied as a system, method, or computer program product (e.g., embodied in one or more computer readable media having computer readable program code embodied thereon), and might be in the form of hardware, software, or a combination of software and hardware. Computer readable media may be a computer readable signal medium (e.g., an electronic, magnetic, optical, electromagnetic, infrared, or semiconductor system, apparatus, or device, or any suitable combination of the foregoing) or a computer readable storage medium (e.g., an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing).

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++, and procedural programming languages such as C. The program code may execute entirely on a user's computer, entirely on the remote computer or server, or partly on a user's computer and partly on a remote computer or server. A remote computer may communicate with a user's computer through any type of communications network, e.g., a local area network, a wide area network, or the Internet.

In the figures, blocks of the flowchart illustrations and block diagrams might be implemented by computer program instructions, which may be provided to a processor of a general purpose computer, special purpose computer, or other programmable data processing apparatus to produce a machine such that the instructions execute to implement the functions/acts specified in the blocks. Computer program instructions may be stored in a computer readable medium that can direct a computer, other programmable data processing apparatus, or other devices to produce an article of manufacture.

In some alternative implementations, the functions noted in the block may occur out of the order noted in the Figures. For example, two blocks shown in succession may be executed substantially concurrently, or the blocks may sometimes be executed in the reverse order, depending upon the functionality involved. Each block of the block diagrams and/or flowchart illustrations might be implemented by special purpose hardware-based systems that perform the specified functions or acts, or combinations of special purpose hardware and computer instructions.

Referring now to FIG. 1, in one aspect, an embodiment of the invention includes an information processing system 10 that features a predictive server 12 and a trading application 14. In the system 10, market data from exchanges such as commodity exchanges 16, stock exchanges 18, and the foreign exchange 20 is obtained from one or more financial data providers 22. The market data is transferred from one of the financial data provider 22 to the predictive server 12. The trading application 14 can get its market data from any of the data providers 22. The predictive server 12 processes the market data using neural networks and intermarket analysis to produce trained neural networks which are then provided to the trading application 14 where the predictive indicators are calculated.

The commodity exchanges 16 can be one or more of any exchanges where the buying and selling of commodities such as grain, cattle, and lumber is performed. Examples of commodity exchanges include the Brazilian Mercantile and Futures Exchange, the CME Group, the Chicago Climate Exchange, the HedgeStreet Exchange, the Intercontinental Exchange, the Kansas City Board of Trade, the Memphis Cotton Exchange, the Mercado a Termino de Buenos Aires, the Minneapolis Grain Exchange, the New York Mercantile Exchange, the U.S. Futures Exchange, Bursa Malaysia, the Central Japan Commodity Exchange, the Dalian Commodity Exchange, the Dubai Mercantile Exchange, the Dubai Gold & Commodities Exchange, the Iranian oil bourse, the Kansai Commodities Exchange, the Mercantile Exchange Nepal Limited, the Multi Commodity Exchange, the National Multi-Commodity Exchange of India Ltd, the National Commodity Exchange Limited, Bhatinda Om & Oil Exchange Ltd., the Karachi, the National Commodity and Derivatives Exchange, the Shanghai Futures Exchange, the Shanghai Singapore Commodity Exchange, the Tokyo Commodity Exchange, the Tokyo Grain Exchange, the Zhengzhou Commodity Exchange, the Commodity Exchange Bratislava, the Climex, the NYSE Liffe, the European Climate Exchange, the London Metal Exchange, the European Energy Exchange, and the Australian Securities Exchange.

The stock exchanges 18 can be one or more of any exchanges where the buying and selling of stocks or other securities occurs. Examples of stock exchanges include the American Stock Exchange (AMEX), the Boston Stock Exchange, the Chicago Stock Exchange, the Cincinnati Stock Exchange, the NASDAQ, the New York Stock Exchange (NYSE), the Pacific Exchange, the Philadelphia Stock Exchange, the Toronto Stock Exchange (TSX), the Alberta Stock Exchange (ASE), the Canadian Venture Exchange (CDNX), the Nasdaq Canada, the Bourse de Montreal, the Jamaica Stock Exchange, the Bolsa Mexicana de Valores (BMV), the Euronext, the Helsinki Stock Exchange HEX, the Paris Stock Exchange, the Frankfurt Stock Exchange, the Italy Stock Exchange, the Amsterdam Stock Exchange, the Oslo Stock Exchange, the Lisbon Stock Exchange, the Warsaw Stock Exchange, the Bucharest Stock Exchange (BVB), the Russia Stock Exchange, the Madrid Stock Exchange, the Stockholm Stock Exchange, the Swiss Stock Exchange, the London Stock Exchange (FTSE), the Tel Aviv Stock Exchange, the Tokyo Stock Exchange (TSE), the Nagoya Stock Exchange, the Nasdaq Japan Market (NJ), the Stock Exchange of Hong Kong (SEHK), the Taiwan Stock Exchange, the Thailand Stock Exchange, the Kuala Lumpur Stock Exchange, the Korea Stock Exchange, the Singapore Stock Exchange, the Buenos Aires Stock Exchange, the Sao Paulo Stock Exchange (BOVESPA), the Rio de Janeiro Stock Exchange, the Brazilian Mercantile and Futures Exchange (BM&F), the Maringa Mercantile and Futures Exchange, the Santiago Stock Exchange, the Australian Stock Exchange (ASX), the New Zealand Stock Exchange (NZSE), and the Johannesburg Stock Exchange.

The foreign exchange (FOREX) 20 is where over-the-counter currency trading takes place. There currently is no central clearing house for over-the-counter currency trading, but rather a network of banks, commercial companies, central banks, hedge funds, investment management firms, retail foreign exchange brokers, non-bank foreign exchange companies, money transfer/remittance companies, and other entities.

The financial data provider 22 can be an organization that obtains and delivers information on markets to interested parties via a variety of data products. Examples of financial data providers include the Commodity Research Bureau, Standard & Poor's, MTS Reference Data, Exchange Data International, Reuters Datalink, Thomson Financial, Interactive Data Corporation, ICAP, and Bloomberg.

The predictive server 12 can be any device or system capable of obtaining data from the financial data provider 22, using neural networks and intermarket analysis to produce a trained neural network, and transmitting data output from the trained network to the predictive trading application 14. The predictive server 12 can accumulate historical data going back decades for thousands of markets supported by the system. It can then use such historical data to train and retrain the server's neural networks (e.g., which can contain over 1,000; 2,000; 5,000; 10,000; 20,000; 40,000; 60,000; 80,000; or 100,000 connections) to make a suite of indicators over a variety of time durations.

Figure 2:
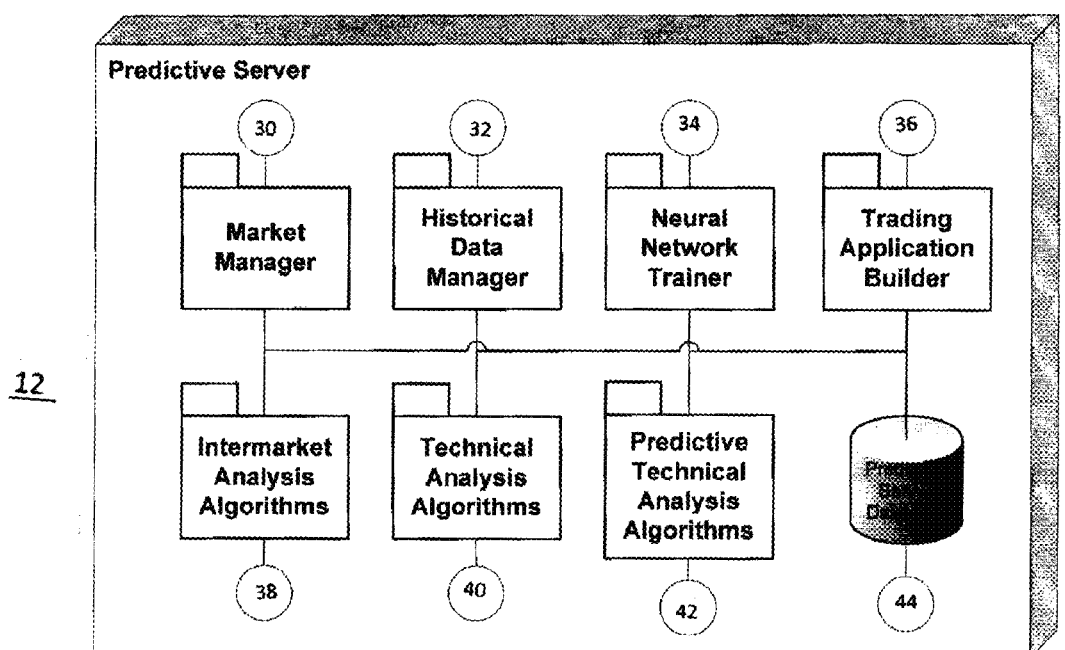
FIG. 2 is block diagram illustrating the architecture of a predictive server.

Referring now to FIG. 2, in one embodiment, the predictive server 12 can include at least four (e.g., 5, 6, 7, or 8) of: a market manager component 30, an historical data manager 32, a neural network trainer 34, a trading application builder 36, an intermarket analysis component 38, a technical analysis component 40, a predictive technical analysis component 42, and predictive server database 44. The market manager component 30 manages the collection of markets supported by the system 10 that are packaged into a variety of products in multiple languages. The historical data manager 32 accumulates (manually or automatically) a variety of financial data for every market in the system. The neural network trainer 34 trains the suite of predictions for each market and tests them against new data, retraining as necessary or desired. The intermarket analysis component 38 searches for and quantifies intermarket relationships that can be used by the neural networks to increase the accuracy of the predictions. The technical analysis component 40 computes technical indicators that are used as inputs to the neural networks to enhance the training process. The predictive technical analysis component 42 integrates the neural network predictions with technical indicator calculations to produce predictive technical indicators for prior periods. Their accuracy can be measured by the predictive server. The predictive server database 44 stores all the market data required to support the system 10. The trading application builder 36 extracts the data necessary for a particular product, version and language of the trading application 14.

The neural network trainer 34 can include an artificial neural network, which is a system that uses a mathematical technique that models the neurons and synapses of a brain. Artificial neural networks have been effectively applied to pattern recognition and time series forecasting problems where the underlying relationships are poorly understood. The neural network can be organized into an input layer, one or more hidden layers, and an output layer. The neural network must be 'trained' on a set of data that includes both inputs and outputs. The training process adjusts the weights of the hidden layer neurons in a guided fashion until the inputs multiplied by the hidden weights is as close as possible to the outputs. Once trained, inputs for which the outputs are not known can be fed into the neural network. It will multiply them by the hidden layer weights and produce a predicted output. See, *Neural Networks in Finance: Gaining Predictive Edge in the Market*, Paul D. McNelis, Academic Press Advanced Finance, 2005; *Neural Networks: A Systematic Introduction*, Raul Rojas. Springer, 1996; and *Neural Networks and the Financial Markets: Predicting, Combining and Portfolio Optimisation* (*Perspectives in Neural Computing*), Jimmy Shadbolt and John G. Taylor, Springer, 2002. The use of neural networks described in U.S. Pat. Nos. 5,303,328; 5,444,819; 6,247,001; 6,735,580; and 7,082,420 might be adapted for use in the current invention.

In one embodiment of the invention, the predicted output can be a prediction of a future value in a time series. As long as the data being run through the neural network is similar to the training data, the prediction will be approximately as accurate as the results obtained during training The accuracy of the prediction depends on many factors, the most important of which can be the presence of patterns in the data and relationship between the inputs and the value being predicted. Neural networks can be trained on electronic exchange data as well as technical indicators to predict the future price of a market.

Figure 3:
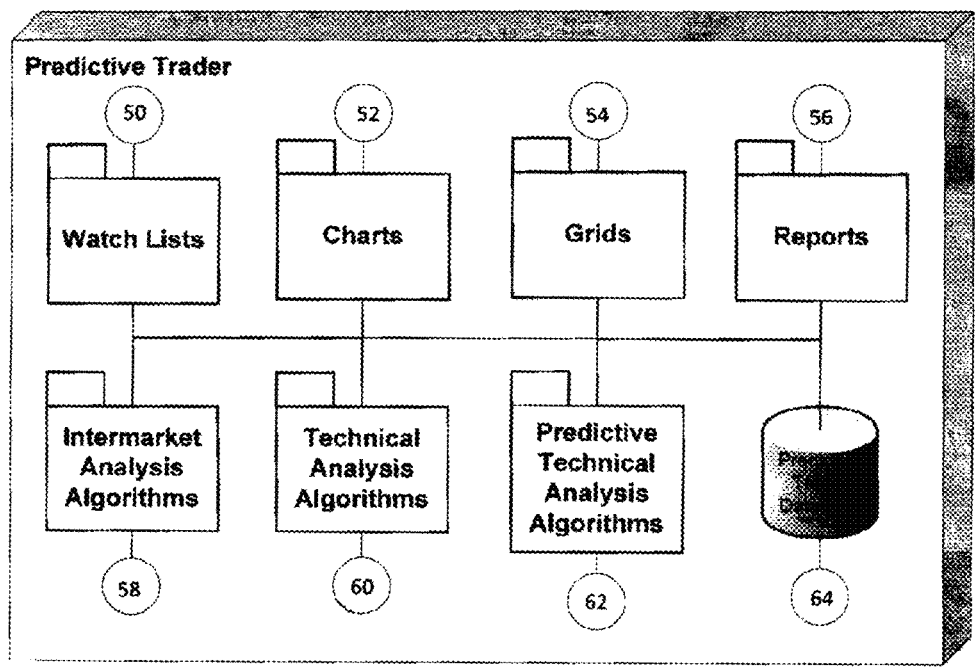
FIG. 3 is block diagram illustrating the components of a trading application for use in the invention.

Referring now to FIG. 3, the trading application 14 can include a watch lists component 50, a charts component 52, a grids component 54, a reports component 56, an intermarket analysis component 58, a technical analysis component 60, a predictive technical analysis component 62, and a predictive trader database 64. The watch lists component 50 can present predictive technical indicators to a trader in a grid with one market on each row and one indicator in each column. The charts component 52 can present the predictive technical indicators to a trader in graphical chart format. The grids component 54 can present the predictive technical indicators to a trader in a grid with one time period on each row and one indicator in each column. The reports component 56 can present the predictive technical indicators to a trader in a variety of report formats. The intermarket analysis component 58 can use the intermarket relationships stored in the predictive trader database 64 to generate inputs to the neural networks. The technical analysis component 60 can use financial time series data to calculate technical indicators for use as inputs to the neural networks. The predictive technical analysis component 62 can calculate predictions of future values of the time series data. The predictive trader database 64 can store data used by the trading application 14.

Figure 4:
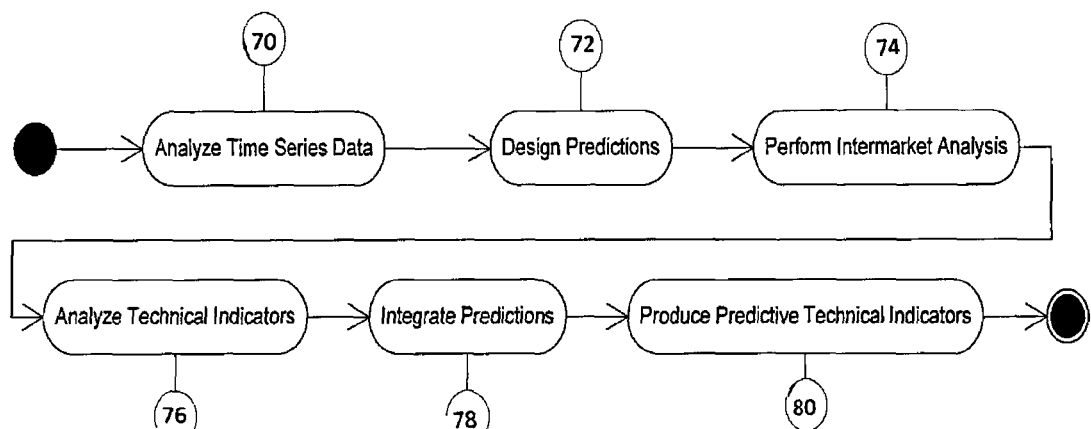
FIG. 4 is flow chart showing a method of generating a predictive technical indicator.

A method for producing predictive technical indicators is illustrated in FIG. 4. In a first step 70, financial time series data is analyzed. In a second step 72, a series of neural network predictions is designed which represents the financial time series data one or more periods in the future. This step 72 can include one or more (e.g., 1, 2, 3, 4, 5, or more) neural network training sessions which can involve using data from different time periods (e.g., all historical, previous five years, previous 1 year, previous 30 days, previous 10 days, previous 5 days, etc.) as inputs to train and retrain a neural network. Intermarket analysis is then performed using the trained neural network in a third step 74 to enhance the accuracy of the predictions. The technical indicator calculations are analyzed in a fourth step 76, and the neural network predictions are then integrated with the technical indicator calculations in a fifth step 78. Finally, in a sixth step 80, predictive technical indicator algorithms are used to produce predictive technical indicators.

As one example, in the first step Analyze Time Series Data 70, the financial time series data can come in two forms, real-time quotes and historical bars. A quote can be for a bid to buy, an ask to sell, or a trade which represents a buy and sell transaction. Each quote has a price and a quantity. An example of a quote would be a bid to buy 500 shares of XYZ stock at $30 per share. Historical bars summarize quote activity over a period of time such as a minute, hour, or day. Each bar contains four prices and one or two quantities. The four prices are open, high, low, and close. The open price represents the price of the first trade of the instrument during the time period covered by the bar. The high price represents the highest price the instrument traded at during the time period covered by the bar. The low price represents the lowest price the instrument traded at during the time period covered by the bar. The close price represents the price of the last trade of the instrument during the time period covered by the bar. The volume represents the quantity of instruments traded during the time period covered by the bar.

In the second step, Design Predictions 72, as exemplified in Table 1 below, predictions can be defined as daily bars, hourly bars, and minute bars; however, any duration from real-time quotes, such as up to monthly bars, could be used. Within each duration, the four components of a bar are predicted—open price, high price, low price, and close price. In addition, in the case of commodities, the next bar's volume and open interest could be predicted as well. Finally, the short, medium, and long term price trends are predicted. These could be expressed as moving averages of the price or any technical indicator. The trends could be calculated using any of the price components or a combination of price components, such as typical price which can be the average of high, low, and close.

TABLE 1

| | Daily Predictions |
|---|---|
| 1. | Predicted Open Price Next Day |
| 2. | Predicted High Price Next Day |
| 3. | Predicted Low Price Next Day |
| 4. | Predicted Close Price Next Day |
| 5. | Predicted Volume Next Day |
| 6. | Predicted Short Term Daily Trend |
| 7. | Predicted Medium Term Daily Trend |
| 8. | Predicted Long Term Daily Trend |
| | Hourly Predictions |
| 9. | Predicted Open Price Next Hour |
| 10. | Predicted High Price Next Hour |
| 11. | Predicted Low Price Next Hour |
| 12. | Predicted Close Price Next Hour |
| 13. | Predicted Volume Next Hour |
| 14. | Predicted Short Term Hourly Trend |
| 15. | Predicted Medium Term Hourly Trend |
| 16. | Predicted Long Term Hourly Trend |
| | Minute Predictions |
| 17. | Predicted Open Price Next Minute |
| 18. | Predicted High Price Next Minute |
| 19. | Predicted Low Price Next Minute |
| 20. | Predicted Close Price Next Minute |
| 21. | Predicted Volume Next Minute |
| 22. | Predicted Short Term Minute Trend |
| 23. | Predicted Medium Term Minute Trend |
| 24. | Predicted Long Term Minute Trend |

The neural networks do not have to predict the desired future price directly. Instead, they can predict any information which can be used to calculate the desired future price. For example, they could predict the change in price from a current or past period to the future period. As another example, they could predict volatility or probability of the price going up or down and that information could be used in a calculation which produces the predicted future price.

How far in the future useful predictions can be made will vary from market to market. It will also vary depending on the current state of changing market conditions. In a preferred embodiment, a goal is to maximize the amount of future information captured by the predictions while minimizing the amount of error introduced. The error of the predictions can be measured across a variety of markets and conditions to determine which ones should be integrated with the technical indicator calculations and how heavily they should be weighted. In addition, the amount of lag inherent in the technical indicator calculation should be factored in as the purpose of the predictions is to overcome the lag.

The third step, Perform Intermarket Analysis 74, processes financial market data to identify, classify and grade relationships between financial markets and/or financial market segments. Neural networks use these relationships and historical data to generate predictions of future market prices.

The fourth step 76 of analyzing technical indicator calculations can be applied to a wide variety of technical indicators. An illustrative example is the Simple Moving Average (SMA) technical indicator. A simple moving average is the average of a price series over a selected time period and gives an equal weight to each price during the period. To calculate the SMA, the sum of prices in the selected time period is divided by the number of prices in the selected time period. As a new price becomes available, it is added to the price series and the oldest price is dropped from the calculation, which allows the average to move over time.

In a hypothetical example, Table 2 below displays the daily close price with predictions of 100 troy ounces of gold traded on the CME Group exchange under the symbol GC during a selected month.

TABLE 2

| A<br>Date | B<br>Close<br>Price | C<br>3-Day<br>SMA Close | D<br>3-Day SMA<br>Close<br>Tomorrow | E<br>Close Price<br>Tomorrow | F<br>Daily Price<br>Change | G<br>Random Error +/−<br>25% of<br>Change |
|---|---|---|---|---|---|---|
| 2009 Feb. 02 | 906.70 | | | 892.00 | −14.70 | 0.18 |
| 2009 Jan. 30 | 927.30 | 906.87 | 913.03 | 906.70 | −20.60 | −0.09 |
| 2009 Jan. 29 | 905.10 | 897.60 | 906.87 | 927.30 | 22.20 | −0.24 |
| 2009 Jan. 28 | 888.20 | 898.83 | 897.60 | 905.10 | 16.90 | 0.08 |
| 2009 Jan. 27 | 899.50 | 901.37 | 898.83 | 888.20 | −11.30 | 0.18 |
| 2009 Jan. 26 | 908.80 | 887.80 | 901.37 | 899.50 | −9.30 | 0.08 |
| 2009 Jan. 23 | 895.80 | 868.23 | 887.80 | 908.80 | 13.00 | 0.03 |
| 2009 Jan. 22 | 858.80 | 854.70 | 868.23 | 895.80 | 37.00 | 0.16 |
| 2009 Jan. 21 | 850.10 | 848.40 | 854.70 | 858.80 | 8.70 | 0.07 |
| 2009 Jan. 20 | 855.20 | 834.13 | 848.40 | 850.10 | −5.10 | −0.21 |
| 2009 Jan. 16 | 839.90 | 818.67 | 834.13 | 855.20 | 15.30 | −0.11 |
| 2009 Jan. 15 | 807.30 | 812.27 | 818.67 | 839.90 | 32.60 | 0.2 |
| 2009 Jan. 14 | 808.80 | 816.83 | 812.27 | 807.30 | −1.50 | 0.22 |
| 2009 Jan. 13 | 820.70 | 832.23 | 816.83 | 808.80 | −11.90 | −0.11 |
| 2009 Jan. 12 | 821.00 | 843.50 | 832.23 | 820.70 | −0.30 | 0.1 |
| 2009 Jan. 09 | 855.00 | 850.40 | 843.50 | 821.00 | −34.00 | 0.03 |
| 2009 Jan. 08 | 854.50 | 854.07 | 850.40 | 855.00 | 0.50 | 0.25 |
| 2009 Jan. 07 | 841.70 | 855.17 | 854.07 | 854.50 | 12.80 | 0.23 |
| 2009 Jan. 06 | 866.00 | 867.77 | 855.17 | 841.70 | −24.30 | −0.09 |
| 2009 Jan. 05 | 857.80 | 873.87 | 867.77 | 866.00 | 8.20 | −0.2 |
| 2009 Jan. 02 | 879.50 | 877.93 | 873.87 | 857.80 | −21.70 | 0.03 |
| 2008 Dec. 31 | 884.30 | | | 879.50 | −4.80 | 0.05 |
| 2008 Dec. 30 | 870.00 | | | 884.30 | 14.30 | 0.13 |
| 2008 Dec. 29 | 875.30 | | | 870.00 | | |

Column A indicates the trading day for the price data. Trading days are determined by the exchange and exclude weekends and some holidays. Column B indicates the close price, which is the final price the gold contract was traded on the day referenced. Column C is the 3-Day SMA Close, which is the 3-day simple moving average of the close price that is calculated each day by averaging the close price for that day and the two prior days. For example, on January 2nd, the close price was $879.50 and the close prices on the prior two trading days, December 31st and December 30th, were $884.30 and $870.00. The total price is $879.50+$884.30+$870.00=$2633.80. The average is calculated by dividing the total by three. $2633.80/3=$877.93. When the SMA moves forward to the next day, it is calculated by averaging the close prices for January 5th, January 2nd, and December 31st. This process is repeated until the moving average is calculated for all of the days in January. Column D is the 3-Day SMA Close Tomorrow. This column stores a 3-day simple moving average of tomorrow's close price. This represents the perfect predictive version of this technical indicator. It is used as the basis for measuring the error of the technical indicators in the next table. Column E is the Close Price Tomorrow, which is simply the close price for the next day. It is used as the basis to calculate a sample prediction of the close price for the next day. A perfect prediction would equal this value. Unfortunately, it is not possible to predict the future with perfect accuracy. Column F, the Daily Price Change, is the amount the price went up or down from the previous day. This is used as the basis for the error in the prediction. The error will be some percentage of the daily price change, not a percentage of the price. Column G is the Random Error +/−25% of Change. This is a random value from −25% to +25%. This simulates the error between the perfect prediction and the real prediction. The error percent is multiplied by the daily price change to calculate the error amount. The error amount is added to the close price tomorrow to calculate the sample prediction for the day.

Figure 5:
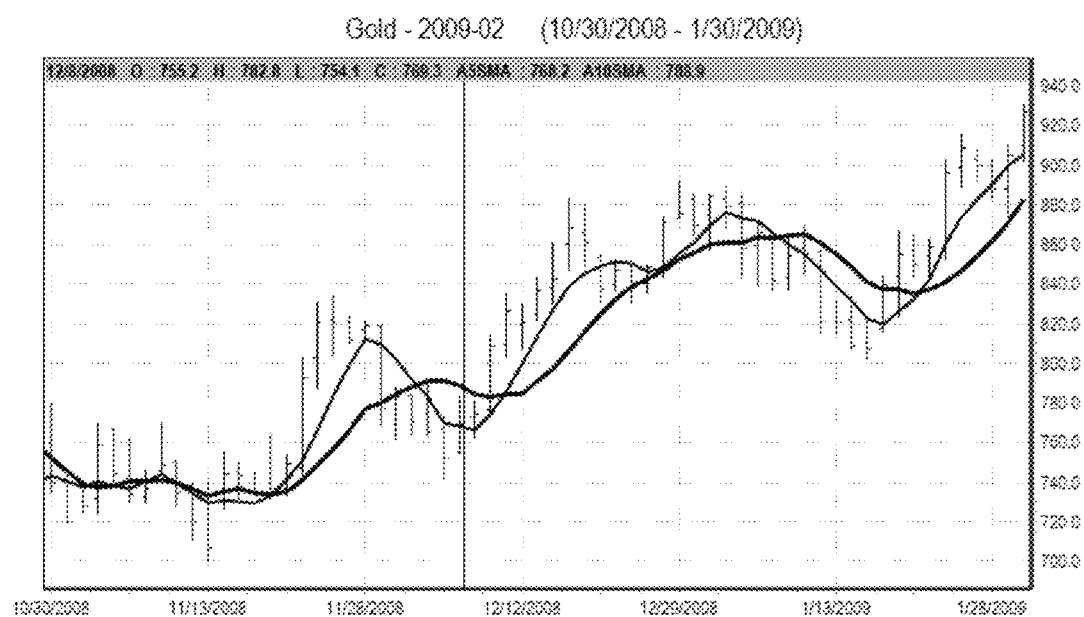
FIG. 5 is a chart displaying the price of gold over three months using daily bars, a 5-day simple moving average, and a 10-day simple moving average.

The chart in FIG. 5 displays the price of gold over three months using daily bars, a 5-day simple moving average, and a 10-day simple moving average. The thinner line represents the 5-day simple moving average while the thicker line represents the 10-day simple moving average. The moving averages have a negative effect called lag. Lag is a delay in periods between when a price change occurs and when the change is reflected in the moving average. The vertical cursor on the chart is positioned just after the bar for December 8th. The price of gold was going down prior to that and started going up after that. The bars, which have no smoothing effect from a moving average, reflected that change in direction on December 8th. The 5-day SMA reflected that change two trading days later on December 10th. The 10-day SMA reflected the upturn in the market even later on December 11th. The larger the number of periods in the moving average, the greater the lag. All moving average systems use historic data only, therefore will always suffer from lag and introduce uncertainty to the trader.

Maximum profit is achieved by buying at the bottom of a cycle and selling at the top of a cycle or vice versa. The delays caused by the lag of moving averages may cause a trader to react late to changes in the market, reducing profit or increasing losses. Techniques such as giving the recent periods more weight than the older periods can also be used to reduce the lag in moving averages. There is, however, a tradeoff between the beneficial smoothing effect of moving averages and the harmful lag effect. In general, anything which helps one will harm the other.

In the fifth step 78, predictions are integrated with technical indicator calculations. Every technical indicator is based on data for a range of periods. A predictive technical indicator can remove the oldest period from the beginning of the range and add the next period's prediction to the end of the range. The example shown in Table 3 below compares a technical indicator calculated using just the predictions with a predictive technical indicator that combines actual prices with predictions. The error is measured as the difference from a technical indicator calculated with the perfect predictions displayed in column D of the previous table.

In the sixth step 80 of producing predictive technical indicators, predictions of the future price are integrated into the technical indicator calculation to reduce the lag without sacrificing smoothing. This can be illustrated by the following example. Assume the price is going up one dollar per day: Day 1-$10, Day 2-$11, Day 3-$12. A 3-day simple moving average calculated on day 3 would be (10+11+12)/3=$11. This represents one day of lag because the price was $11 on Day 2. If one assumes the price on Day 4 is correctly predicted to be $13, then the 3-day simple moving average on Day 3 using Day 2, Day 3, and Day 4 can be calculated as follows: (11+12+13)/3=$12. The moving average price on Day 3 then matches the actual price on Day 3, without sacrificing

TABLE 3

| A<br>Date | H<br>Predicted<br>Close Price<br>Tomorrow | I<br>3-Day SMA<br>of Predicted<br>Close | J<br>3-Day SMA<br>Predicted<br>Close Error | K<br>Predictive 3-<br>Day SMA<br>Close | L<br>Predictive 3-<br>Day SMA<br>Close Error |
|---|---|---|---|---|---|
| 2009 Feb. 02 | | | | | |
| 2009 Jan. 30 | 908.55 | 912.33 | −0.71 | 913.65 | 0.62 |
| 2009 Jan. 29 | 921.97 | 904.86 | −2.00 | 905.09 | −1.78 |
| 2009 Jan. 28 | 906.45 | 897.12 | −0.48 | 898.05 | 0.45 |
| 2009 Jan. 27 | 886.17 | 898.04 | −0.80 | 898.16 | −0.68 |
| 2009 Jan. 26 | 898.76 | 903.22 | 1.86 | 901.12 | −0.25 |
| 2009 Jan. 23 | 909.19 | 890.11 | 2.31 | 887.93 | 0.13 |
| 2009 Jan. 22 | 901.72 | 870.77 | 2.53 | 870.21 | 1.97 |
| 2009 Jan. 21 | 859.41 | 854.70 | 0.00 | 854.90 | 0.20 |
| 2009 Jan. 20 | 851.17 | 850.37 | 1.97 | 848.76 | 0.36 |
| 2009 Jan. 16 | 853.52 | 835.64 | 1.50 | 833.57 | −0.56 |
| 2009 Jan. 15 | 846.42 | 821.17 | 2.50 | 820.84 | 2.17 |
| 2009 Jan. 14 | 806.97 | 812.58 | 0.32 | 812.16 | −0.11 |
| 2009 Jan. 13 | 810.11 | 816.92 | 0.09 | 817.27 | 0.44 |
| 2009 Jan. 12 | 820.67 | 831.93 | −0.31 | 832.22 | −0.01 |
| 2009 Jan. 09 | 819.98 | 844.18 | 0.68 | 843.16 | −0.34 |
| 2009 Jan. 08 | 855.13 | 852.15 | 1.75 | 850.44 | 0.04 |
| 2009 Jan. 07 | 857.44 | 855.23 | 1.16 | 855.05 | 0.98 |
| 2009 Jan. 06 | 843.89 | 855.13 | −0.03 | 855.90 | 0.73 |
| 2009 Jan. 05 | 864.36 | 866.92 | −0.84 | 867.22 | −0.55 |
| 2009 Jan. 02 | 857.15 | 874.19 | 0.32 | 873.65 | −0.22 |
| 2008 Dec. 31 | 879.26 | | | | |
| 2008 Dec. 30 | 886.16 | | | | |
| 2008 Dec. 29 | | | Average<br>Error<br>0.59 | | Average<br>Error<br>0.18 |

Column H, the Predicted Close Price Tomorrow, is simulated by taking the close price tomorrow and adjusting it by random plus or minus twenty five percent of the price change from the previous day. Column I is the 3-Day SMA Predicted Close, which is calculated by averaging the current predicted close with the prior two predicted closes each day. Column J, the 3-Day SMA Predicted Close Error, is calculated by subtracting the 3-day SMA of predicted close (column I in Table 3) from the 3-day SMA Close Tomorrow (column D in Table 2). Column K is the predictive 3-day simple moving average of close, which is calculated by averaging the predicted close price for tomorrow with the actual close prices for today and yesterday. Column L, the predictive 3-day simple moving average of close error, is calculated by subtracting the 3-day SMA of close tomorrow (column D) from the predictive 3-day SMA close (column K).

smoothing. In this example, integrating predictions into technical indicators reduces their negative side effects while retaining their benefits.

The predictive technical indicator method can, in some cases, also reduce the error in the result dramatically. Each prediction contains error. The technical indicator calculated in column J includes the error from three predictions. The predictive technical indicator in column L only uses one prediction. As a result, two-thirds of the error is eliminated. This is reflected in the error of column L, being one-third the error in column J. Most technical indicators use more than three periods worth of data, which can make the reduction in error even more significant.

EXAMPLE

---

Predictive EMA Example

---

/// <summary>
/// This method calculates a predictive exponential moving average.

-continued

Predictive EMA Example

```
/// </summary>
/// <param name="data">Actual values (close price) for each period.</param>
/// <param name="periods">Predicted values (close price) for each period.</param>
/// <returns></returns>
private static float[ ] ExponentialMovingAverage(float[ ] data, float[ ] pData, int periods)
{
    float[ ] vals = new float[data.Length];
    float smoothingConstant = 2.0F / (periods + 1);
    // For each period we wish to calculate an EMA for
    for (int index = 1 + periods – 2; index < data.Length; index++)
    {
        // Prime the ema with the prior value
        // Start one period ahead of normal because the prediction will be tacked onto the end
        float ema = data[index – periods + 1];
        // Accumulate the ema for the specified number of periods
        for (int cur = index – periods + 2; cur <= index + 1; cur++)
        {
            // Use the actual values for all periods except the last which uses the prediction.
            if (cur != index + 1)
                ema =AccumulateEma(smoothingConstant, data[cur], ema);
            else
                ema = AccumulateEma(smoothingConstant, pData[cur–1], ema);
        }
        vals[index] = ema;
    }
    return vals;
}
/// <summary>
/// For background information on calculating an exponential moving average, please consult a
Technical Indicator reference.
/// </summary>
/// <param name="periods"></param>
/// <param name="curValue"></param>
/// <param name="prevValue"></param>
/// <returns></returns>
private static float AccumulateEma(float smoothConstant, float curValue, float prevValue)
{
    return (smoothConstant * curValue + (1 – smoothConstant) * prevValue);
}
```

Other Embodiments

It is to be understood that while the invention has been described in conjunction with the detailed description thereof, the foregoing description is intended to illustrate and not limit the scope of the invention, which is defined by the scope of the appended claims. For example, the detailed description includes the use of technical analysis components but fundamental analysis components could be substituted for or used in conjunction with technical analysis components. This would make the predictive technical indicators more sensitive to the fundamental financial environment and possibly more accurate during times of strong fundamental changes. Other aspects, advantages, and modifications are within the scope of the following claims.

What is claimed is:

1. A method of calculating a technical indicator of a financial market using a computer, the method comprising the steps of:
    inputting to the computer historical time series data relating to the market from a server comprising a database of historical time series data for the market;
    inputting to the computer predicted future time series data relating to the market;
    using the computer to process the historical data and the predicted future time series data to calculate the technical indicator; and
    outputting the calculated technical indicator, wherein the predicted future time series data relating to the market is obtained from a predictive server that uses intermarket analysis data to train a neural network to predict financial time series data for the market.

2. The method of claim 1, wherein the predictive server comprises at least four selected from the group consisting of: a market manager component, an historical data manager, a neural network trainer, a trading application builder, an intermarket analysis component, a technical analysis component, a predictive technical analysis component, and a predictive server database.

3. The method of claim 2, wherein the predictive server comprises a market manager component, an historical data manager, a neural network trainer, a trading application builder, an intermarket analysis component, a technical analysis component, a predictive technical analysis component, and a predictive server database.

4. The method of claim 1, wherein the calculated technical indicator is communicated to a trading application via a communications network.

5. The method of claim 2, wherein the trading application comprises a watch lists component, a charts component, a grids component, a reports component, an intermarket analysis component, a technical analysis component, a predictive technical analysis component, and a predicative trader database.

6. The method of claim 1, wherein the market is a stock market or other securities market.

7. The method of claim 1, wherein the market is a commodity market or futures market.

8. The method of claim 1, wherein the market is a currency market.

9. A system for calculating a technical indicator of a market, the system comprising:
- a first server comprising a database of historical time series data for the market;
- a second server configured to use intermarket analysis data to train a neural network to generate predicted future financial time series data for the market; and
- a computer in communication with the first and second servers, and comprising computer-usable program code that uses both historical time series data for the market and the predicted future financial time series data for the market to calculate the technical indicator.

10. The system of claim 9, wherein the second server comprises a market manager component, an historical data manager, a neural network trainer, a trading application builder, an intermarket analysis component, a technical analysis component, a predictive technical analysis component, and a predictive server database.

11. The system of claim 9, wherein the system further comprises a trading application, and the calculated technical indicator is communicated to the trading application via a communications network.

12. The system of claim 11, wherein the trading application comprises a watch lists component, a charts component, a grids component, a reports component, an intermarket analysis component, a technical analysis component, a predictive technical analysis component, and a predicative trader database.

13. The system of claim 9, wherein the market is a stock market or other securities market.

14. The system of claim 9, wherein the market is a commodity market or futures market.

15. The system of claim 9, wherein the market is a currency market.

* * * * *